United States Patent Office 3,182,056
Patented May 4, 1965

3,182,056
9(11)-DEHYDRO-17,21-ALKYLIDENEDIOXY PREGNENES
Masato Tanabe, Palo Alto, Calif., assignor to Schering Corporation, Bloomfield, N.J., a corporation of New Jersey
No Drawing. Filed June 21, 1963, Ser. No. 289,708
7 Claims. (Cl. 260—239.55)

This invention relates to compositions of matter which may be identified as 17α,21-alkylidenedioxy derivatives of 3,20-diketo-9(11)-pregnenes, the alkylidenedioxy portion being further defined hereinbelow and to processes for making and using such compositions.

The invention sought to be patented in its composition aspect is described as residing in the concept of a chemical compound having the molecular structure of a 3,20-diketo-9(11)-dehydropregnene, which may contain other substituents or unsaturation in the A, B, C, and D-rings, in which there is attached through the 17α- and 21-position the moiety:

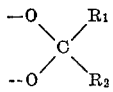

wherein $R_1$ is a member of the group consisting of hydrogen and lower alkyl, and $R_2$ is a member of the group consisting of lower alkyl, phenyl, phenyl lower alkyl, and that group which is formed by $R_1$ and $R_2$ together with the carbon atom to which they are both attached consisting of cyclohexylidene and cyclopentylidene.

These compounds are useful intermediates in the preparation of 9,11-dihalogeno analogs and 9α-halogeno-11β-hydroxy (and acyloxy) analogs which themselves are valuable therapeutic agents useful in anti-inflammatory therapy as disclosed and claimed in my co-pending application, Serial No. 132,543, filed August 21, 1961, now U.S. Patent No. 3,116,289, of which this application is a continuation-in-part.

As stated hereinabove, other substituents may be present in one or more of the four fused rings. Indeed, additional unsaturation may be present at the 4-position and preferably at the 1- and 4-positions. There may be, for example, a lower alkyl such as methyl at one or more of the 2, 6, and 16-positions, halogen at the 6-position, and lower alkylidene, preferably methylene, at the 16-position. Thus, a more limited and more specific representation of the composition aspect of this invention is that represented by pregnatrienes having the following structural formula:

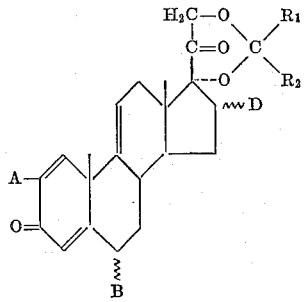

including the 1,2-dihydro analog thereof, wherein $R_1$ and $R_2$ are as above defined, A is a member of the group consisting of hydrogen and methyl, B is a member of the group consisting of hydrogen, methyl, and halogen (preferably fluoro), D is a member of the group consisting of hydrogen, lower alkyl (preferably methyl) and lower alkylidene (preferably methylene). The wavy line at the 6- and 16-positions is indicative of the fact that both the α and β-epimers are considered within the scope of and part of my invention.

A method for preparing the tangible embodiments of the composition aspects of the invention is that wherein a 3,20-diketo-17α,21-dihydroxy-9(11)-dehydropregnene is reacted with a carbonyl reactant such as ketone or aldehyde (or ketal or acetal thereof) whereby the 17α-hydroxy and 21-hydroxy group is transformed into the aforedescribed cyclic derivative.

As the carbonyl reactant in my process, there may be employed aliphatic ketones such as acetone, methylethyl ketone, 3-pentanone and the like, cycloaliphatic ketones such as cyclohexanone, cyclopentanone and the like, aromatic ketones such as propiophenone, benzophenone and the like, aldehydes such as acetaldehyde, benzaldehyde and the like. I prefer to use the carbonyl reactant in the form of its lower alkyl acetal or ketal since I have obtained better yields and have been able to more easily separate and purify my product than when the free ketone or aldehyde of such reagents is used. Lower alkyl ketals of acetone, particularly 2,2-dimethoxypropane, are the reagents of choice.

The reaction is preferably carried out in a non-reactive, non-aqueous solvent. I prefer a polar solvent such as dimethylformamide but other solvents may be employed such as tetrahydrofuran and dioxane. The acid catalyst is preferably a strong acid such as p-toluenesulfonic acid; however, other strong acids such as sulfuric, hydrochloric, or trifluoroacetic may be employed. In actuality, any acid having a $-\log K$ of less than 2.25 may be employed as catalyst.

The time required to effect optimum yield of the 17,21-alkylidenedioxy group will vary depending on the temperature of reaction and reactivity of the steroid. The reaction may be followed by employing stains which are specific for the dihydroxyacetone side chain such as blue tetrazolium. Normally present functional groups or substituents elsewhere in the fused ring portion of the pregnane molecule do not interefere with the formation of the alkylidenedioxy group.

The compounds of the instant application are immediate precursors of analogous compounds possessing a halogen at the 9α-position and at the 11β-position. Halogenation of the 9(11)-bond, such as chlorination, gives rise to the corresponding 9,11-dichloro ketonide which has valuable properties per se. Alternatively, the 9(11)-double bond may be transformed into a 9α-halogeno-11β-hydroxy (or acyloxy) group as described in my parent application. The ketonide structure is unstable to high concentrations of acid and thus partial cleavage of the structure may occur during this transformation. The unpurified product resulting therefrom is thus re-acted with a carbonyl reagent such as 2,2-dimethoxypropane to ensure complete derivatization of the 17α- and 21-hydroxy groups. These transformations and products obtained thereby are disclosed in my aforementioned co-pending parent application, the specification of which is incorporated herein by reference.

The novel intermediates of this invention serve a further useful purpose in another manner in the ultimate preparation of, for example, the 9,11-disubstituted-17α,21-ketonides of my parent application. In the synthesis of 9α,11β - dichloro - 3,20 - diketo - 17α,21 - isoproylidene - dioxy-1,4-pregnadiene (or its 16-methyl analogs) from 11-epiprednisolone (or its 16-methyl analogs) the following steps heretofore have been necessary:

Step 1: Selectively protect the 21-hydroxy group of 11-epiprednisolone with an ester such as a cathylate so as to avoid reaction of the 21-hydroxy group during the subsequent dehydration of the 11-hydroxyl group. Preferably the dehydration of the 11-hydroxyl group is per-formed by way of an alkaline "de-tosylation" of an 11α-tosylate. Thus, in order to avoid tosylation at C-21, selective protection is necessary. During such selective protection some esterification of the 11α-hydroxy group inadvertently does occur. Step 2 is the tosylation of the 11α-hydroxy group with p-toluenesulfonyl chloride in the presence of pyridine. Step 3 comprises "de-tosylation" by means of alkali so as to introduce a 9(11)-double bond. Step 4 comprises chlorination of the 9(11)-double bond. Step 5 comprises saponification of the 21-ester. Step 6 comprises formation of the 17α,21-ketonide.

By virtue of the novel compounds claimed herein, this sequence of steps is markedly reduced providing for a greater ease of operation, increase in overall yield, and the like. Now as step 1 there would be prepared the 17α,21-ketonide of 11-epiprednisolone (11α-hydroxy-3,20-diketo-17α,21-isopropylidenedioxy-1,4-pregnadiene), as described in my parent case and herein for analogous compounds, without the danger of side reaction of the 11-oxygen. Steps 2 and 3 are the same as in the older process—that is 11α-tosylation followed by "de-tosylation" to yield a compound of this invention. Step 4 comprises the halogenation of the 9(11)-bond resulting in the dihalogeno ketonide. Thus, in four steps there has been accomplished what required six steps.

In similar fashion, one could start with 11-epihydrocortisone and then the series of reaction products would be 3-keto-Δ⁴-monoenes which could be dehydrogenated at the 1,2-position at any stage by known microbiological means.

In addition to the foregoing, the novel intermediates described and claimed herein lend themselves in an analogous manner as do those of my parent application to further reaction at the 21-position, such as acylation, alkanoylation, and the like. In this instance, however, the 9,11-position is still vacant and may be subjected to any of the known reactions for substitution thereof. Thus, the tangible embodiments of this invention provide an alternate means for arriving at products described and claimed in my parent application aside from direct reaction of a 17α,21-dihydroxypregnene already possessing its full component of nuclear substituents.

The following example is illustrative of a method of preparing the tangible embodiments of this invention in addition to those set forth heretofore:

Reflux for six hours a solution of 2.0 grams of 1,4,9(11)-pregnatriene-17α,21-diol-3,20-dione in 4 ml. of dimethylformamide and 15 ml. of 2,2-dimethoxypropane to which has been added a crystal of p-toluenesulfonic acid. Concentrate to a residue in vacuo, dissolve the residue in benzene and adsorb onto 40 g. of acid-washed alumina. Elute with benzene and then chloroform-benzene (1:2). Combine and evaporate eluates to dryness. Crystallize from acetone yielding 17α,21-isopropylidenedioxy-1,4,9(11)-pregnatriene-3,20-dione.

By substituting 2,2-dimethoxypropane with other ketals, corresponding alkylidenedioxy analogs are formed. Representative of such ketals are 2,2-dimethoxybutane, 2,2-dimethoxypentane, 1,1-dimethoxycyclohexane, 3,3-dimethoxypentane which, repectively, give rise to 17α,21-(2-butylidenedioxy)-, 17α,21-(2-pentylidenedioxy)-, 17α,21-cyclohexylidenedioxy-, 17α,21-(3-pentylidenedioxy)-analogs of the compound prepared above. Similarly, ketones such as phenylacetone when employed give rise to the 17α,21-(1-phenyl-2-propylidenedioxy)-analog.

Aldehyde reagents such as acetaldehyde, benzaldehyde, or acetals thereof, may be utilized as the carbonyl reagent giving rise to 17α,21-benzylidenedioxy and 17α,21-ethylidenedioxy-analogs, respectively.

When the pregnatriene reactant described above is replaced by a 4,9(11)-pregnadiene or other 1,4,9(11)-pregnatriene having a free 17α-hydroxy group and 21-hydroxy group, the analogous product is formed. Typical of such pregnadienes and pregnatrienes are those represented by the following structural formula:

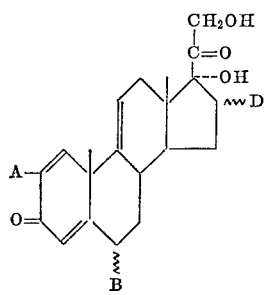

and the 1,2-dihydro analogs thereof wherein A represents hydrogen or methyl, B represents hydrogen, methyl, or halogen (preferably fluorine) both of the α and β-configuration, and D represents hydrogen, lower alkyl (α and β), preferably methyl, and lower alkylidene, preferably methylene.

I claim:

1. A compound of the group consisting of pregnenes having the structural formula:

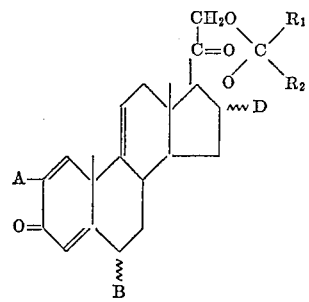

and the 1,2-dihydro analogs thereof wherein A is a member of the group consisting of hydrogen and methyl, B is a member of the group consisting of hydrogen, methyl, and halogen, D is a member of the group consisting of hydrogen, lower alkyl, and lower alkylidene, $R_1$ is a member of the group consisting of hydrogen and lower alkyl and $R_2$ is a member of the group consisting of lower alkyl, phenyl, phenyl lower alkyl, and that group which is formed by $R_1$ and $R_2$ together with the carbon atom to which they are both attached consisting of cyclohexylidene and cyclopentylidene.

2. 17α,21-isopropylidenedioxy-1,4,9(11)-pregnatriene-3,20-dione.

3. 16-methyl-17α,21-isopropylidenedioxy-1,4,9(11)-pregnatriene-3,20-dione.

4. 16-methylene-17α,21-isopropylidenedioxy-1,4,9(11)-pregnatriene-3,20-dione.

5. 6α-methyl-17α,21-isopropylidenedioxy-4,9(11)-pregnadiene-3,20-dione.

6. 6α-methyl-17α,21-isopropylidenedioxy-1,4,9(11)-pregnatriene-3,20-dione.

7. 6α-fluoro-17α,21-isopropylidenedioxy-1,4,9(11)-pregnatriene-3,20-dione.

No references cited.

LEWIS GOTTS, Primary Examiner.